United States Patent [19]

Goldstein et al.

[11] Patent Number: 5,222,845

[45] Date of Patent: Jun. 29, 1993

[54] ADJUSTABLE DRILL GUIDE FOR DOOR HANDLES AND LOCKS

[76] Inventors: Steven M. Goldstein, 3404 Collin Ct., Fremont, Calif. 94536; Frederick P. Collier, 6170 Linford Terrace, Fremont, Calif. 94555

[21] Appl. No.: 901,966

[22] Filed: Jun. 22, 1992

[51] Int. Cl.$^5$ .............................................. B23B 41/00
[52] U.S. Cl. ................................. 408/103; 408/115 R
[58] Field of Search ............ 408/97, 103, 108, 115 R, 408/115 B

[56] References Cited

U.S. PATENT DOCUMENTS

| | | | |
|---|---|---|---|
| 1,128,970 | 2/1915 | Godefrey et al. | 408/103 |
| 4,137,003 | 1/1979 | Budoff | 408/108 |
| 4,306,823 | 12/1981 | Nashlund | 408/108 |
| 4,594,032 | 6/1986 | Warburg | 408/115 R |
| 4,715,125 | 12/1987 | Livick | 408/115 R |
| 4,813,826 | 3/1989 | Riedel | 408/115 R |
| 5,116,170 | 5/1992 | Palmer et al. | 408/115 B |

FOREIGN PATENT DOCUMENTS

| | | | |
|---|---|---|---|
| 136080 | 4/1985 | European Pat. Off. | 408/115 R |
| 2645576 | 10/1990 | France | 408/115 R |

*Primary Examiner*—Daniel W. Howell
*Attorney, Agent, or Firm*—Gary Appel

[57] ABSTRACT

A drill guide apparatus for enabling the accurate drilling of holes in a door for the installation of a door handle assembly or lock comprises a generally U-shaped member sized to fit around the edge of a conventional door into which holes are to be drilled for the installation of the door handle assembly or lock. A C-type clamp is included for rigidly clamping the U-shaped member to the edge of said door in the region to be drilled. A drill bushing is installed through a region of the U-shaped member in a location enabling, when the apparatus is clamped to the edge of the door, the guiding a drill for drilling a hole into the edge of the door. A plurality of side plates is provided, each of which has a plurality of drill guide apertures or bushings arranged in relative locations for guiding the drilling of holes through the door for the installation of a particular type of door handle assembly or lock. Any one of the side plates is detachably fastened to one leg of the U-shaped member so that when apparatus is clamped onto the edge of the door, the drill guide apertures or drill bushings of the attached side plate are in such a positional relationship with the drill guide bushing in the U-shaped member that the drilling of holes through the drill bushing in U-shaped member and the drill guide apertures or bushings in the side plate into or through the door will be properly located for the subsequent installation the door handle assembly or lock.

4 Claims, 2 Drawing Sheets

ADJUSTABLE DRILL GUIDE FOR DOOR HANDLES AND LOCKS

BACKGROUND OF THE INVENTION

1. Field of the Invention

The present invention relates generally to the field of hole drilling templates and guides, and, more particularly, to hole drilling guides for enabling the correct positional drilling of holes for the installation of door hardware, such as door handles and locks.

2. Background Discussion

It is well known to builders, carpenters, home improvement contractors, and many home owners that the installation of original or new doors, particularly, conventional entry doors, is usually a difficult and pains-taking job. One of the hardest tasks associated with the installation of such doors is installing the door hardware—that is, the door handle assembly and/or the deadbolt lock. The hardest part of installing the door handle assembly or deadbolt lock is drilling the installation and mounting holes in the right place and perpendicular to the door.

In this regard, a paper or light cardboard hole-locating template is usually provided with a purchased door handle assembly or deadbolt lock. By means of wrapping the template around the edge of the door in the location where the door handle or lock is to be installed and by the use of a pointed instrument, such as an awl or center-punch, the centers of the required holes can be marked on the door. This is usually easier said than done, since the paper template is easily torn and must be securely fastened to the door—usually by tape. Even when properly positioned around the edge of the door, it is easy to mis-mark the hole locations. If the hole centers are even marked slightly off center, installation of the handle assembly or deadbolt lock becomes very difficult and often requires enlarging the hole diameter, thereby resulting in a sloppy fit.

Even if the hole locations are very accurately located by the use of a template, the drilling of proper holes is extremely difficult. A standard, good commercial quality entry door is one and three quarters (1¾) thick. The mounting holes for the door handle or deadbolt lock are required to be drilled entirely through the door so that screws or bolts can interconnect the parts of the handle or lock which go on the outside exterior side of the door with the parts that go on the inside or interior side of the door. For the screws or bolts to properly interconnect, these outside and inside parts of the handle or lock, the installation holes must be drilled through the door exactly "square" (i.e., perpendicular) to the sides of the door. Moreover, the locking or latching part of the door handle or lock must come in from the adjacent edge of the door exactly square to the edge of the door of the locking or latching part of the handle or the lock will bind. If the holes are even slightly off-square, they usually have to be redrilled oversize or reamed out to enable the handle or lock to be installed and operate freely. On the other hand, if any of the holes are badly off-square, a fix may be impossible without ruining the appearance of the door.

If the door handles and/or deadbolt locks are installed at the factory where the doors are made, drill presses may be used to assure that the drilled holes are square to the door. There is, however, a need for a small, relatively inexpensive drill guide apparatus that can be used for the installing of door handle assemblies and deadbolt locks at the building or home site. Such a drill guide apparatus, which is provided by the present inventor and is described hereinbelow, not only assures trouble-free installation of the door hardware, but greatly simplifies the job of installing door handle assemblies and deadbolt locks so that even relatively inexperienced individuals can do a good job. Moreover, the apparatus enables the rapid installation of the door handle assemblies and deadbolt locks and eliminates, or at least greatly reduces, damage to the doors.

SUMMARY OF THE INVENTION

In accordance with the present invention, there is provided a drill guide apparatus for enabling the accurate drilling of holes in a door for the installation of a door handle assembly or lock thereinto. The drill guide apparatus comprises a drill guide member having a first leg and a second leg connected together to form an L-shaped drill guide portion, the first leg being configured for placement against an edge of a door to be drilled for a door handle assembly or lock and the second leg being configured for placement along a side region of the door adjacent its edge. The first and second legs are constructed of a rigid material and have a plurality of apertures and/or drill bushings arranged in a pattern matching the installation hole pattern of a particular door handle assembly or lock to be installed into the door, the apertures and/or drill bushings having drill-guiding diameters matching the drill sizes required for the installation holes. Included are means for detachably fastening the L-shaped drill guide portion to the door in a location for drilling the door handle or lock installation holes.

According to a preferred embodiment of the invention, the above-mentioned second leg is formed having a fixed portion and a detachable portion, there being provided means for attaching the detachable portion to the fixed portion. The detachable portion has at least one large drill guide aperture and at least two drill guide bushings, the drill guide aperture and drill guide bushings being arranged in a pattern associated with the particular door handle assembly or lock.

It is preferred that there be included a plurality of the detachable portions, each of which is configured for a different type of door handle assembly or lock so that the drill guide apparatus can be used with a like plurality of different types of door handle assemblies and locks.

Preferably, the means for detachably fastening the L-shaped portion to a door comprises a third leg fixed to first leg so as to form a U-shaped member and further includes a clamping screw and plate. The clamping screw extends through the third leg and into the clamping plate; the turning of the clamping screw in one direction causes a clamping action between the clamping plate and the second leg so as to clamp a door therebetween, thereby clamping the apparatus to the door. Turning the screw in the opposite direction releases the apparatus from the door.

Thus, according to a preferred embodiment, the drill guide apparatus comprises a generally U-shaped member sized to fit around the edge of a conventional door into which holes are to be drilled for the installation of a door handle assembly or lock and means for rigidly clamping the U-shaped member to the edge of said door. A drill bushing is installed through a region of the U-shaped member in a location enabling, when the U-shaped member is clamped to the edge of the door, the guiding a drill for drilling a hole into the edge of the door for receiving the locking or latching portion of the door handle assembly or lock. Included is a plurality of side plates, each of which is configured to provide drill guiding for a different type of door handle assembly or door lock, and each of which has a plurality of drill guide apertures or bushings arranged in relative locations for guiding the drilling of holes through the door for the installation of a particular type of door handle assembly or lock. In such case, means are included for detachably attaching any one of the side plates to one leg of the U-shaped member so that when the U-shaped member is clamped onto the edge of the door, the drill guide apertures or drill bushings of the attached side plate are in such a positional relationship with the drill guide bushing in the U-shaped member that the drilling of holes through the drill bushing in U-shaped member and the drill guide apertures or bushings in the side plate into or through the door to which the U-shaped member is clamped will be properly located for the subsequent installation in the door of the particular type of door handle assembly or lock.

BRIEF DESCRIPTION OF THE DRAWINGS

The present invention can be more readily understood by a consideration of the following detailed description when taken in conjunction with the accompanying drawings, in which.

In the various FIGS. identical elements and features are given the same reference number.

DETAILED DESCRIPTION OF THE INVENTION

Figure 1:
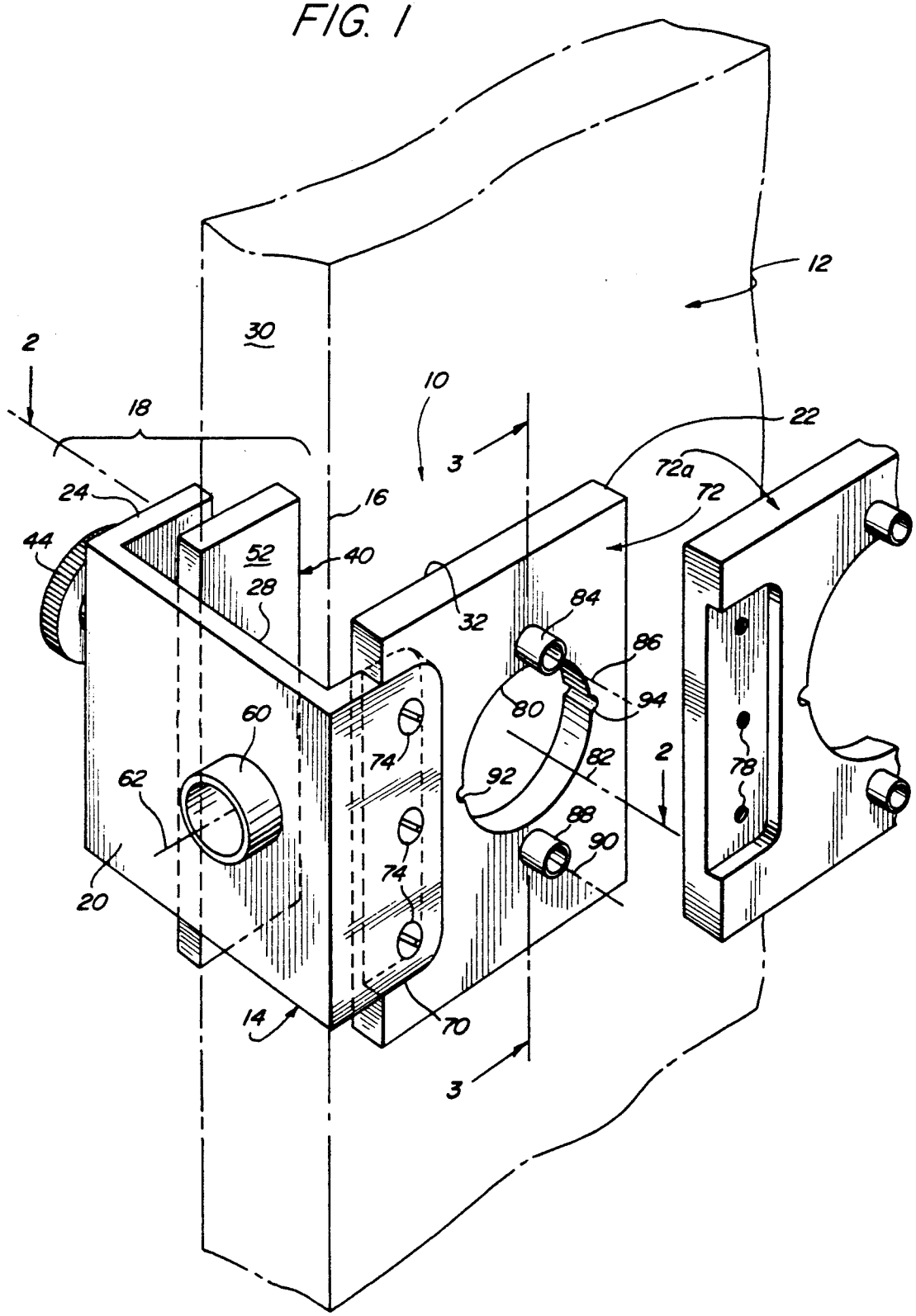
FIG. 1 is a perspective drawing of a drill guide apparatus for enabling the accurate drilling of holes in a door for the installation of door handles, locks and the like, showing the manner in which the apparatus is constructed and showing the apparatus clamped to the edge of a conventional entrance door.
Figure 2:
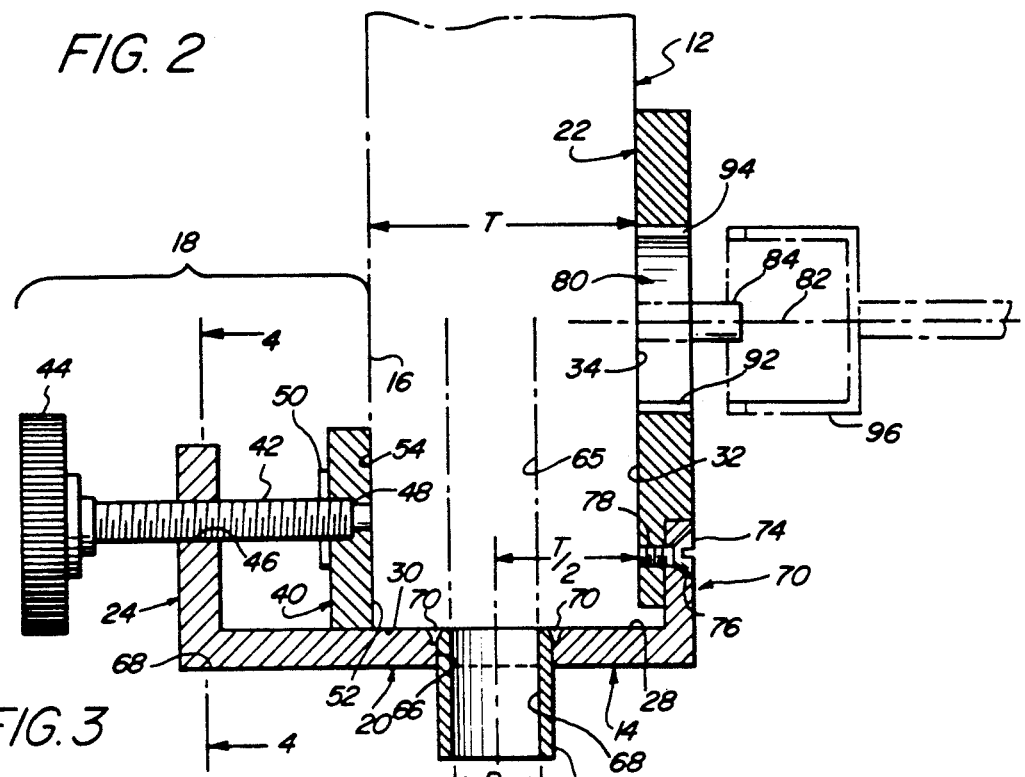
FIG. 2 is a horizontal cross sectional drawing taken along line 2—2 of FIG. 1, showing specific features of the drill guide apparatus and showing the manner in which the apparatus is self-clamped to an exposed edge of a door in a position where it is intended to install a door lock or handle.

There is shown in FIGS. 1 and 2 a drill guide apparatus 10, in accordance with the present invention, for use in installing door hardware (not shown), such as a door handle assembly and/or lock, especially a deadbolt lock, on a door 12 (shown in phantom lines) onto which the apparatus is temporarily attached for drill guiding purposes. Comprising drill guide apparatus 10 are a generally U-shaped member 14 which fits around an end region 16 of door 12 and detaohable attaching or clamping means 18 which is used for clamping the U-shaped member to the door edge in the region where a door handle assembly or deadbolt lock is to be installed.

U-Shaped member 14 comprises a first leg 20, a second leg 22 and a third leg 24, the third leg also forming a part of clamping means 18. Upon attachment of drill guide apparatus 10 to door edge region 16, an inner surface 28 of first leg 20 abuts against an edge surface 30 of door 12, while an inner surface 32 of second leg 22 abuts against an inside surface 34 of the door (FIG. 2).

Clamping means 18 comprises third leg 24 of U-shaped member 14, a rigid plate 40 and a screw 42 having at an outer end a gripping knob 44. Screw 42 extends through a threaded aperture 46 in third leg 24 and extends into an aperture 48 in plate 40, being retained therein by a washer 50. It can, therefore be appreciated that the turning of screw 42, by means of knob 44 causes plate 40 to move toward or away from second leg 22. Drill guide apparatus is thus clamped to door 12 by turning screw 42 in a direction clamping door region 16 between inner surface 32 of second leg 22 and an inner surface 52 of plate 40 which bears against an outside surface 54 of the door. In this manner, clamping means 18 is operative for clipping drill guide apparatus 10 tightly against door region 16 in a location where a door handle assembly or deadbolt lock is to be installed.

First leg 20 of U-shaped member 14 is constructed having an elongate drill guide bushing 60 installed on a perpendicular axis 62. For use with a door 12 having a thickness, T, axis 62 is located a distance, T/2, from second leg inner surface 32 (FIG. 2). Since for most solid entry doors, thickness, T, is 1¾ inches, the distance, T/2, is ⅞ inch. It is, of course, to be understood that apparatus 10 can be constructed having a different dimension, T/2, for use with doors 12 having different thicknesses, T.

Ordinarily, a 1 inch diameter hole is required to be drilled in door region 16 from edge surface 30 for receiving the latching and locking mechanism of a door handle assembly or a deadbolt of a deadbolt lock. Therefore, an inner diameter, D1, of drill guide bushing 60 is 1 inch for receiving and guiding a 1 inch drill bit 64 (shown in phantom lines in FIG. 2) used to drill a 1 inch diameter hole 65 in door region 16 from edge surface 30. Bushing 60, which is mounted in an aperture 66 in first leg 20, projects forwardly, from an outer surface 68 of the first leg, a preferred distance of at least about ¾ inch so as to provide wobble-free guiding of drill bit 64.

Although U-shaped member 14 may be constructed of aluminum alloy, preferably between ⅜ to ½ inch thick, bushing 60 is preferably constructed of a hard steel, such as tool steel or stainless steel, so that an inner surface 68 is subject to virtually no wear by drill bit 64 and can be used many times. Nevertheless, bushing 60 is retained in aperture 60 by set screws 70, so it can be easily replaced when it becomes worn or if it becomes damaged (for example, by being used with a drill bit 64 which is too large).

Figure 3:
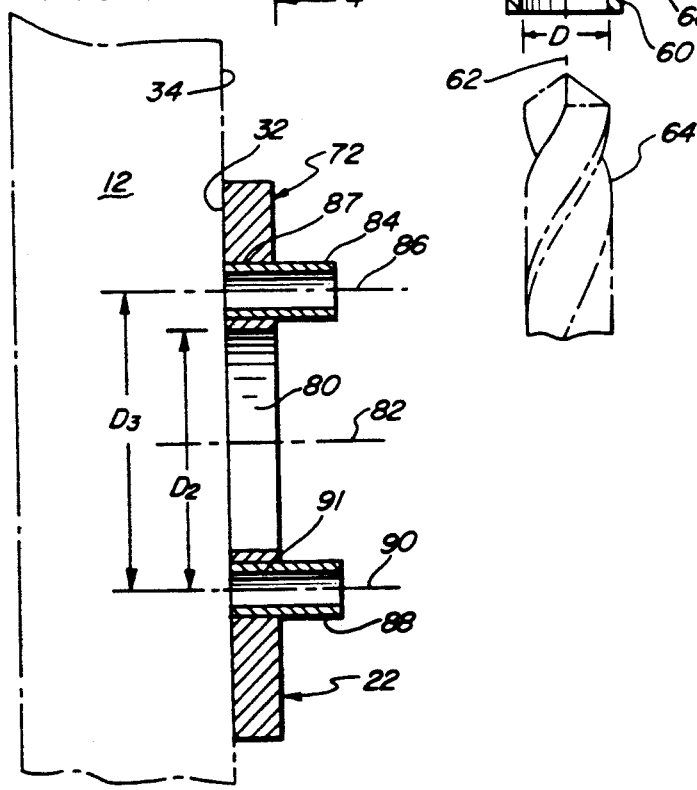
FIG. 3 is a vertical cross sectional drawing taken along line 3—3 of FIG. 1 showing features of the portion of the apparatus used for guiding the drilling of holes through the door for the installation of a door handle of lock.
Figure 4:
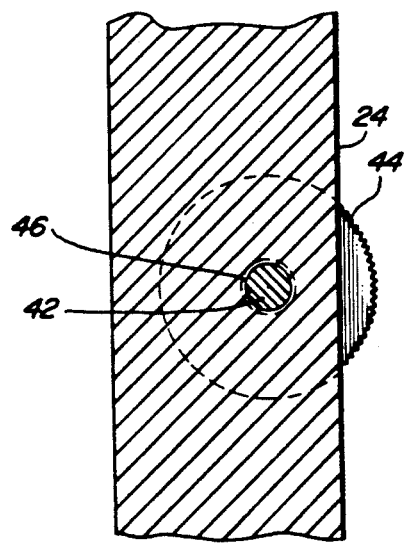
FIG. 4 is a vertical cross sectional drawing taken along line 4—4 of FIG. 2, showing features of the clamping portion of the apparatus.

Although hole 65 is ordinarily required to be 1 inch in diameter for all types of door handle assemblies and deadbolt locks, the through (i.e., side-to-side) mounting holes in door region 16 required for the door handle and deadbolt lock may be different for different types and manufacturers (such as SCHALGE, KWIKSET, WESLOCK and EAGLE) of the handles and locks. For that reason, it is preferred that second leg 22 of U-shaped member 14 be constructed of a short leg portion 70 which is an integral part of the U-shaped member and a detachable plate portion 72 which is fastened to the leg portion by a plurality of screws 74 (FIGS. 1 and 2) which extend through apertures 76 in leg portion 70 and into threaded holes 78 in plate portion 72 (FIG. 3). Plate portion 72 is preferably formed having a recessed region 76 into which leg portion 70 closely fits to assure that the leg portion and the plate portion are rigidly and non-slipably connected together by screws 74.

As shown in FIGS. 1 and 2, plate portion 72 has formed therein or fixed thereto a large drill guide aperture 80 on a cross axis 82, an upper drill guide bushing 84 on a cross axis 86, and a lower drill guide bushing 88 on a cross axis 90, both such drill guide bushings being about 1 inch long and being inserted into and through plate portion 72 in respective apertures 87 and 91 (FIG. 3).

Aperture 80 is typically 2⅛ inches in diameter (D2, FIG. 3) for receiving and guiding a 2⅛ inch hole saw 92 (shown in phantom lines in FIG. 2). For a particular type of door handle assembly, drill guide bushings 84 and 88 have inner diameters of ⅜ inch for receiving and guiding a ⅜ inch drill bit (not shown) and their axes 86 and 90 are spaced a distance D3, apart which is equal to 2⅜ inches, with axes 82, 86 and 90 being in a common vertical plane (FIG. 3). Recesses 92 and 94, preferably for guiding a ⅛ inch drill bit (not shown) are formed at opposite sides of aperture 80.

As shown in FIG. 1, a plurality of plate portions 72, 72a(and others, not shown) are provided, each plate portion being configured with drill guide apertures and/or drill guide bushings (as described above for plate portion 72) arranged and sized for a particular type of door handle assembly or deadbolt lock having a different installation hole pattern and/or hole size and each being labeled accordingly. Thus, when different handles or locks are to be installed, the appropriate one of plate portions 72, 72a, . . . is selected and is attached to leg portion 70 by screws 74.

The operation of apparatus 10 is apparent from the foregoing. After the various holes are drilled in door 12 using the various apertures and drill bushings in the apparatus as guides, the apparatus is unclamped from the door and the door handle assembly or lock for which the holes were drilled is installed in the door in the usual manner (ordinarily, in the manner described in the manufacturer's instruction sheet accompanying the door handle or lock).

By way of a specific example, with no limitation thereto being intended or implied, first side 20 of U-shaped member 14 may be about 4 inches square and about ⅛ inch thick. Second leg 70 preferably extends about ⅛ inches from face 68 of first leg 20 and third leg 24 extends about 2 inches from such surface, the second leg being about ¼ inch this and the third leg being about ⅜ inch thick. Plate 40 is about 1½ inches wide, about 5¼ inches high and about ¾ inch thick. Plate portion 72 is preferably about 5 inches wide, about 5¼ inches high and about ⅛ inch thick. U-shaped member 14, plate 40 and plate portion 72 are all preferably constructed of a hard aluminum alloy for light weight, strength and durability.

Although there is described above a hole drilling guide apparatus configured for enabling the accurate drilling of holes in a door for the installation of a door handle or lock for the purpose of illustrating the manner in which the present invention can be used to advantage, it is to be understood that the invention is not limited thereto. Therefore, any and all modifications and variations which may occur to those skilled in the art are to be considered to be included within the scope and spirit of the claims appended hereto.

What is claimed is:

1. A drill guide apparatus for enabling the accurate drilling of holes in a door for the installation of a door handle assembly or lock thereinto, the drill guide apparatus comprising:

a drill guide member having a first leg and a second leg connected together to form an L-shaped drill guide portion, said first leg being configured for placement against an edge of a door to be drilled for a door handle assembly or lock and said second leg being configured for placement along a side region of said door adjacent to said edge, said first and second legs being constructed of a rigid material;

said first leg including at least one aperture or drill bushing arranged in a pattern matching the installation hole pattern of a particular door handle assembly or lock to be installed to said door;

a plurality of detachable portions, each having a plurality of apertures and drill bushings arranged in a pattern matching the installation hole pattern of a particular door handle assembly or lock to be installed in said door, said apertures and drill bushings having drill-guiding diameters matching the drill sizes required for said installation holes;

means for securing each of said detachable portions to said second leg, said means for securing including a distal edge portion of said second leg and a mutually engaging edge portion of each of said detachable portions;

means for detachably fastening said drill guide member to said door in a location for drilling said installation holes, including a third leg extending from said first leg in parallel, opposed relationship to said second leg, and a clamping screw and plate, said clamping screw extending through said third leg and into said clamping plate, the turning of said clamping screw in one direction causing a clamping action between the clamping plate and said second leg so as to clamp a door therebetween.

2. The drill guide apparatus of claim 1, wherein said second leg and said third leg each include distal edges disposed as approximately equal distance from said first leg, said detachable portions extending distally beyond said distal edges of said second leg and said third leg.

3. The drill guide apparatus of claim 1, wherein said third leg includes a distal edge spaced apart from said first leg, and said apertures and drill bushings of said plurality of detachable portions are spaced apart a greater distance from said first leg than said distal edge from said first leg.

4. The drill guide apparatus of claim 1, wherein said mutually engaging edge portions of each of said detachable portions are provided with mortised portions that interfit with said distal edge portion of said second leg to properly orient and place each of said detachable portions.

* * * * *